J. W. COLEMAN.
Hand Corn-Planters.
No. 140,186.
Patented June 24, 1873.
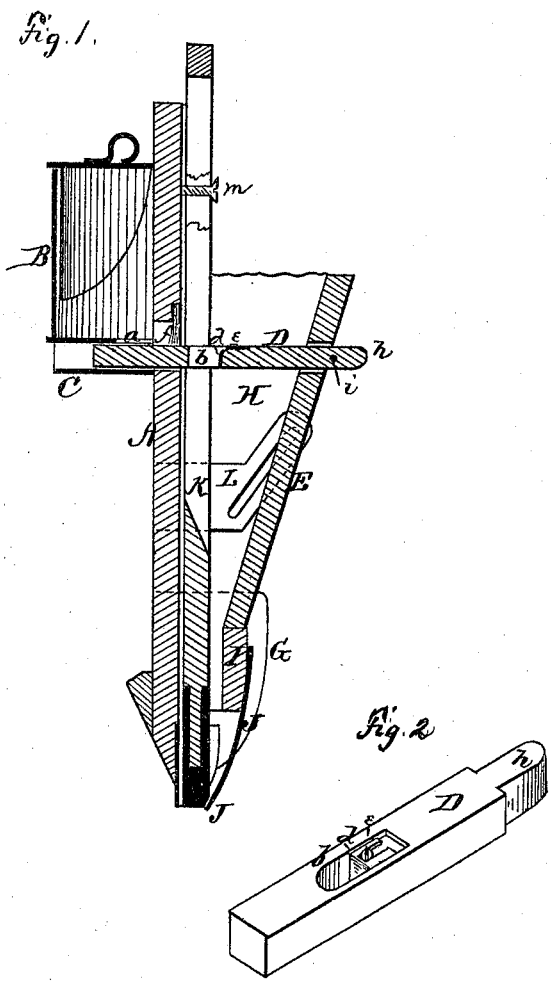
Witness:
Franck L. Durand
C. L. Ewrt
Inventor.
Johnson W. Coleman
per Alexander Mason
Attorneys.

UNITED STATES PATENT OFFICE.

JOHNSON W. COLEMAN, OF BRIDGEVILLE, MICHIGAN.

IMPROVEMENT IN HAND CORN-PLANTERS.

Specification forming part of Letters Patent No. 140,186, dated June 24, 1873; application filed February 27, 1873.

*To all whom it may concern:*

Be it known that I, JOHNSON W. COLEMAN, of Bridgeville, in the county of Gratiot and in the State of Michigan, have invented certain new and useful Improvements in Hand Corn-Planters; and do hereby declare that the following is a full, clear, and exact description thereof, reference being had to the accompanying drawings and to the letters of reference marked thereon making a part of this specification.

The nature of my invention consists in the construction and arrangement of a planter for planting corn, beans, sorghum, and broomcorn, as will be hereinafter more fully set forth.

In order to enable others skilled in the art to which my invention appertains to make and use the same, I will now proceed to describe its construction and operation, referring to the annexed drawing, in which—

Figure 1 is a vertical section of my corn-planter; and Fig. 2 is a perspective view of the feed-slide.

A represents the body of the planter, provided with hopper B on the rear side. In the bottom of the hopper B is an aperture, $a$, and under the same is a guide, C, in which the feed-slide D moves horizontally back and forth through an opening in the body A. In the slide D is an aperture, $b$, with a slide, $d$, held by a screw, $e$, which slide can be adjusted so as to make the aperture larger or smaller, according to the amount of corn to be deposited at each downward movement of the plunger. In the opening in the body A, immediately above the feed-slide D, is a brush, $f$, to prevent any more than the required amount of corn to be taken out by the slide. The front end of the slide D is attached in a mortise on a bar, E, which is hinged at its lower end, and its sides connected, by canvas H or other suitable flexible material, with the sides of the body A. The slide D has, at its front end, a tenon, $h$, passing through the bar E, and held by a pin, $i$, passing through said tenon on the outer side of the bar. The lower end of the bar E is hinged or pivoted between two plates, G G, fastened on the sides of the body A; and at the lower end of the bar, between said plates, is secured a piece, I, which forms a guide for the lower end of the plunger K, and to this guide-piece is attached a spring-plate, J, which closes the lower end of the planter. The plunger K is laid against the front side of the body A, and held there during its up-and-down movement by means of the guide-piece I above described, and by a headed screw, $m$, passing through a vertical slot in the plunger into the body A. To the plunger K is attached an angular arm, L, which is slotted, as shown, and passes over a pin in the side of the hinged bar E.

When the plunger is drawn up the slotted angular arm L closes the bar E onto the body A, moving the slide D toward the rear, so that the desired amount of corn can fall down through the opening $a$ in the bottom of the hopper into the aperture in the slide. By now forcing the plunger downward the bar E is moved outward, drawing the feed-slide forward, and the corn in the aperture $b$ of the same at once drops down through a channel in the guide-piece I into the foot of the planter. At the next upward stroke of the plunger the spring-plate J closes said foot, retaining the corn in the same until the next downward stroke, when the plunger pushes it out into the ground.

Having thus fully described my invention, what I claim as new, and desire to secure by Letters Patent, is—

The combination of the body A with hopper B, foot G, and spring-plate J, the seed-slide D, bar E, canvas H, and plunger K with angular arm L, all constructed and arranged substantially as and for the purposes herein set forth.

In testimony that I claim the foregoing I have hereunto set my hand this 3d day of February, 1873.

JOHNSON W. COLEMAN.

Witnesses:
PORTER K. PERRIN,
JOHN D. NELSON.